(12) United States Patent
Barratt (10) Patent No.: US 12,529,353 B2
(45) Date of Patent: Jan. 20, 2026

(54) APPARATUS FOR PRODUCING ELECTRICITY FROM A MOVING FLUID AND METHOD

(71) Applicant: Sine Delta AS, Hafrsfjord (NO)

(72) Inventor: Steven Barratt, Hafrsfjord (NO)

(73) Assignee: Sine Delta AS, Hafrsfjord (NO)

( * ) Notice: Subject to any disclaimer, the term of this patent is extended or adjusted under 35 U.S.C. 154(b) by 0 days.

(21) Appl. No.: 18/723,791

(22) PCT Filed: Jan. 13, 2023

(86) PCT No.: PCT/NO2023/050006
§ 371 (c)(1),
(2) Date: Jun. 24, 2024

(87) PCT Pub. No.: WO2023/140739
PCT Pub. Date: Jul. 27, 2023

(65) Prior Publication Data
US 2025/0059947 A1 Feb. 20, 2025

(30) Foreign Application Priority Data

Jan. 19, 2022 (NO) .................................. 20220068

(51) Int. Cl.
*F03D 5/06* (2006.01)
*F03B 13/18* (2006.01)
*F03D 9/25* (2016.01)

(52) U.S. Cl.
CPC .............. *F03D 5/06* (2013.01); *F03B 13/182* (2013.01); *F03D 9/25* (2016.05); *F05B 2220/706* (2013.01); *F05B 2240/91* (2013.01); *F05B 2240/917* (2013.01); *F05B 2240/97* (2013.01)

(58) Field of Classification Search
CPC ............ F05B 2240/91; F05B 2240/917; F05B 2240/97
(Continued)

(56) References Cited

U.S. PATENT DOCUMENTS 4,364,709 A * 12/1982 Tornquist ................ F03D 3/061
416/197 A
2006/0064972 A1 3/2006 Allen
(Continued)

FOREIGN PATENT DOCUMENTS

| AU | 2016101763 A4 * | 11/2016 |
| CN | 113738574 | 12/2021 |
| WO | 2021115640 | 6/2021 |

OTHER PUBLICATIONS

Search Report for Corresponding Norwegian Application No. 20220068, dated Aug. 18, 2022.
(Continued)

*Primary Examiner* — Charles Reid, Jr.
(74) *Attorney, Agent, or Firm* — Andrus Intellectual Property Law, LLP (57) ABSTRACT

An apparatus is for producing electricity from a moving fluid, wherein the apparatus has: an elongated body having a longitudinal axis, the elongated body being arranged to be attached to the ground or seabed and exposed to the moving fluid; at least one tensioned cable, which is supported in tension from the elongated body, and which is arranged at least in part inside the elongated body and further arranged to oscillate or vibrate upon oscillation of the elongated body; and at least one energy harvester for converting kinetic energy of the at least one oscillating or vibrating tensioned cable to electric energy.

16 Claims, 7 Drawing Sheets

(58) Field of Classification Search
USPC .................................. 290/42, 43, 53, 54
See application file for complete search history.

(56) References Cited

U.S. PATENT DOCUMENTS

| | | |
|---|---|---|
| 2008/0048455 A1 | 2/2008 | Carney |
| 2009/0295163 A1 | 12/2009 | Frayne |
| 2013/0127167 A1* | 5/2013 | Dore .................. C09D 4/00 290/53 |
| 2017/0284365 A1 | 10/2017 | Yañez Villarreal |
| 2019/0101100 A1 | 4/2019 | Yáñez Villareal |
| 2020/0049130 A1 | 2/2020 | Yáñez Villarreal |

OTHER PUBLICATIONS

International Search Report and the Written Opinion for Corresponding Application No. PCT/NO2023/050006, dated May 11, 2023.

Response to the Written Opinion for Application No. PCT/NO2023/050006, dated Jun. 29, 2023.

Second Written Opinion for Application No. PCT/NO2023/050006, dated Aug. 3, 2023.

Response to the Written Opinion for Application No. PCT/NO2023/050006, dated Aug. 31, 2023.

International Preliminary Report on Patentability for Corresponding Application No. PCT/NO2023/050006, dated Mar. 22, 2024.

Yáñez Villarreal, D. J. ( Jun. 7, 2018). VIV resonant wind generators. Retrieved from https://www.vortexbladeless.com.

Grouthier, C., Michelin, S., & de Langre, E. (2014). On the efficiency of energy harvesting using vortex-induced vibrations of cables. Journal of Fluids and Structures, 49, 487-501.

Vortex Bladeless. Retrieved on Jun. 24, 2024, from https://web.archive.org/web/20211020181828/https:/vortexbladeless.com/technology-design/.

* cited by examiner

APPARATUS FOR PRODUCING ELECTRICITY FROM A MOVING FLUID AND METHOD

CROSS-REFERENCE TO RELATED APPLICATIONS

This application is the U.S. national stage application of International Application No. PCT/NO2023/050006, filed Jan. 13, 2023, which international application was published on Jul. 27, 2023, as WO 2023/140739 in the English language. The International Application claims priority to Norwegian Patent Application No. 20220068, filed Jan. 19, 2022. The international application and Norwegian application are both incorporated herein by reference, in their entirety.

FIELD

The present invention relates to energy production from renewable resources, and in particular, it relates to an apparatus for producing electricity from a moving fluid and a related method.

BACKGROUND

There is an increasing desire to produce electrical energy from renewable resources such as wind and water. Wind turbines are widely used to capture the kinetic energy in wind by use of rotatable blades to drive a turbine. Using rotating blades to capture the wind energy has certain drawbacks, including for example causing death to birds, causing noise pollution and being visually disruptive for living life. The rotating parts typically have to cope with large forces and stress and may have a limited lifetime.

Various attempts have been made to produce electrical energy from wind without using rotating blades. The article "On the efficiency of energy harvesting using vortex-induced vibrations of cables" by Grouthier, Michelin et al. published in the Journal of Fluids and Structures (Volume 49, August 2014) discusses three arrangements, the first one comprising an elastically mounted rigid cylinder set in motion by the wind, the second one comprising a tensioned cable with distributed energy harvesters attached to the tensioned cable, and the third one comprising a hanging cable with a single energy harvester. The study aimed to compare the three arrangements in terms of their ability to harvest energy from low velocity geophysical flows.

SUMMARY

According to a first aspect of the invention, there is provided an apparatus for producing electricity from a moving fluid, the apparatus comprising:
- an elongated body having a longitudinal axis, the elongated body being arranged to be attached to the ground or seabed and exposed to the moving fluid;
- at least one tensioned cable, which is supported in tension from the elongated body, and which is arranged at least in part inside the elongated body and further arranged to oscillate or vibrate upon oscillation of the elongated body; and
- at least one energy harvester for converting kinetic energy of the at least one oscillating or vibrating tensioned cable to electric energy.

The elongated body may be attached to the ground, in use. The elongated body may extend vertically upward from the ground, in use. The elongated body may be positioned fully or partially in water. The elongated body may be fixed to a floating object, such as a barge, which is fixed to the ground or the seabed. The moving fluid can be or can comprise any of: water, air, and gas.

Typically, the at least one tensioned cable is arranged at least in part along the longitudinal axis. Typically, all of the at least one tensioned cable is arranged along the longitudinal axis.

Typically, the at least one energy harvester comprises at least one magnet and at least one coil.

Typically, a first end of the tension cable is attached to the elongated body and may be advantageous in that kinetic energy of the elongated body can be transferred to the at least one tensioned cable making the at least one tensioned cable oscillate relative to both the elongated body and the ground or seabed. The oscillations of the at least one tensioned cable may be converted to electric energy by using the at least one magnet and at least one coil.

The at least one magnet may be set in motion by the at least one tensioned cable and move relative to the at least one coil. The at least one coil may be attached to the ground or the seabed and be stationary relative to the ground or the seabed. The at least one coil may be connected to the elongated body.

Typically, the elongated body comprises a cylindrical structure arranged to be exposed to the fluid in use.

The cylindrical structure may be advantageous in that it may induce vortex forces when the fluid passes the elongated body. The vortex forces may set the elongated body in motion. The elongated body may have a substantially tapered shape.

Typically, an end of the elongated body can be attached fixedly to the ground in use, the elongated body further extending vertically from the ground and being exposed to wind.

Typically, the apparatus further comprises damping means, which can be attached to a lower end of the elongated body in use.

The damping means may prevent fatigue of the elongated body.

Typically, the at least one tensioned cable has an end which is fixedly secured to the elongated body.

Typically, the at least one tensioned cable has another end which is fixedly secured to or near the ground.

Securing the second end to or near the ground can be advantageous in that it can provide a nearly static fixing point for one end of the at least one tensioned cable. When the first end of the at least one tensioned cable is moved by the elongated body, this imposes waves moving along the at least one tensioned cable. Fixedly securing the at least one tensioned cable makes the waves reflect, so that kinetic energy is preserved.

Typically, the at least one energy harvester is positioned inside the elongated body.

Typically, the apparatus further comprises a support body for supporting at least a part of the energy harvester, the support body being arranged inside the elongated body and extending along the longitudinal axis.

The support body may be secured at one end to the ground, in use. The at least one coil may be attached to the support body. The support body can be advantageous in that it can provide a stationary support for the at least one coil inside the elongated body, so that the at least one magnet may move relative to the at least one coil.

Typically, the at least one energy harvester further comprises a vibration capture means for capturing at least part of the kinetic energy of the at least one tensioned cable.

The vibration capture means may be attached to the at least one tensioned cable. The vibration capture means may have a mass of 0.1 kg or greater. The energy capture means may have a mass of 1 kg or below. The energy capture means may have a mass of 1 kg or greater. The energy capture means may have a mass of 5 kg or less. A mass above 0.1 kg may be advantageous in that when the mass is set in motion by the oscillating cable, it can carry a significant momentum which can provide a more stable oscillation of the vibration capture means.

Typically, the at least one energy harvester further comprises a vibration capture means comprising the at least one magnet, and a conversion means comprising the at least one coil, the vibration capture means being arranged to be set in motion by the at least one tensioned cable and to move relative to the at least one coil. The coil can be a horizontal coil or a vertical coil. The coil can be fixedly disposed on the support body. For example, the coil can be integrated into a wall structure of the support body. The horizontal coil may be wound about a horizontal axis and the vibration capture means can be configured so that the magnet is movable in a direction along the horizontal axis e.g. in a central region of the coil. The vertical coil can be wound about a vertical axis. The vibration capture means can then be configured so that the magnet is movable in a direction substantially parallel to the windings of the coil. Advantageously, several coils with vertical axes can be provided in different positions around a circumference whereby the magnets can oscillate horizontally, resulting in direct drive conversion of vibrations to electrical energy in the coils, which can allow conversion in several directions without requiring to adjust the direction of the apparatus with changing wind direction.

Typically, the vibration capture means further comprises a first capture means and a second capture means, the first and second capture means being arranged to transfer horizontal movement to vertical movement, wherein the first capture means is fixed to the at least one tensioned cable and the second capture means is attached to the support body and arranged to move vertically in use.

Typically, the support body is fixed to the ground and arranged to be static relative to the elongated body.

Converting horizontal movement to vertical movement can be advantageous in that it may enable the energy harvester to capture oscillations in any horizontal direction and convert it to oscillation in one direction, namely vertical. When the magnets oscillate vertically, they may induce electric currents in the coils attached to the support body. Hence, one can avoid adjusting the direction of the apparatus with changing wind direction. Typically, the support body is an internal part of the elongated body or is attached to the elongated body.

According to a second aspect of the invention, there is provided a method of producing electric energy from wind by use of the apparatus in accordance with the first aspect of the invention.

BRIEF DESCRIPTION OF THE DRAWINGS

There will now be described, by way of example only, embodiments of the invention, with reference to the accompanying drawings, in which.

DETAILED DESCRIPTION OF THE DRAWINGS

In the description the terms lateral and horizontal are used to specify directions that are mainly horizontal. The term vertical is used to indicate directions that are mainly vertical. Upwards, downwards, vertical and horizontal, are used to indicate directions of the apparatus 100 when mounted vertically on the ground. Similarly, upper and lower refer to the apparatus 100 when mounted vertically on the ground.

Figure 1:
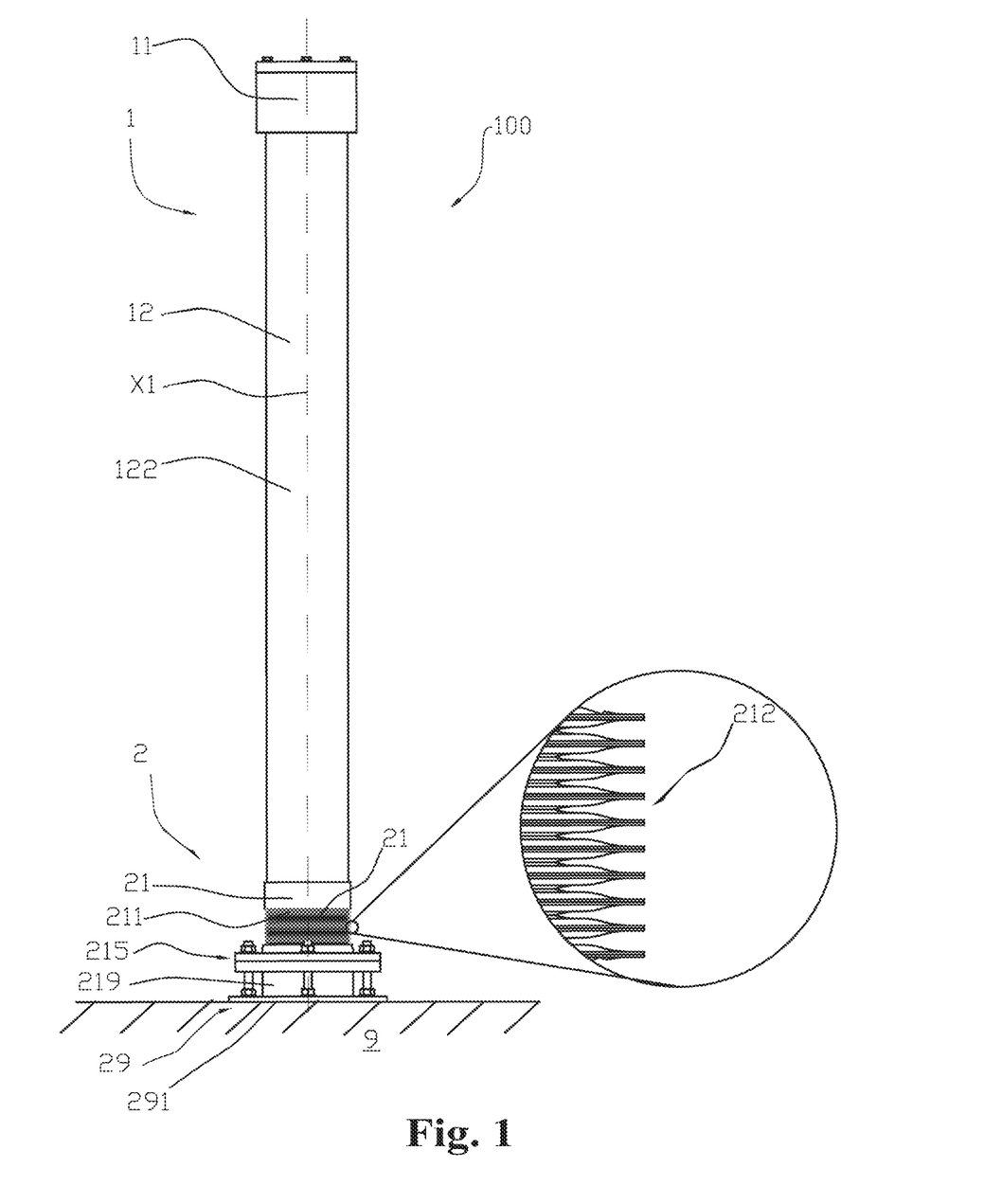
FIG. 1 shows an apparatus for producing electricity from wind.

The apparatus 100 shown in FIG. 1 comprises an elongated body 1 and a base 2. The base 2 is fixedly attached to the ground 9. The elongated body 1 is attached to the base 2 and extends vertically upward from the base 2 between first and second ends of the elongate body 1. The elongated body 1 is arranged to vibrate or oscillate when exposed to wind.

Figure 2:
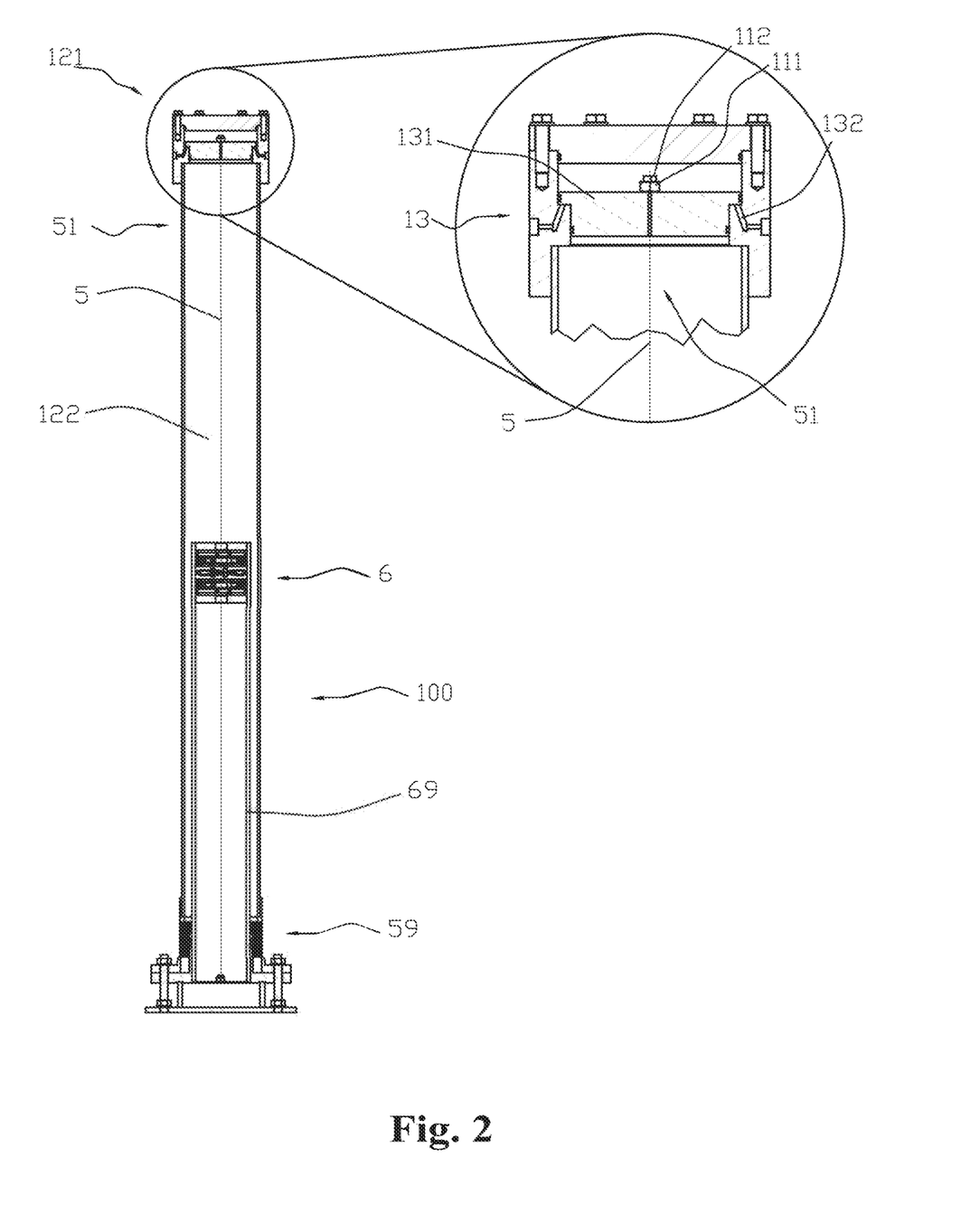
FIG. 2 shows a vertical intersection of the apparatus including a detailed image of an end cap.

As shown in FIG. 2, the apparatus 100 further comprises a tensioned cable 5 arranged inside the elongated body 1. The tensioned cable 5 can be a wire, rope made of polymer or organic fibres, or any non-rigid wire, string, cable or rope that can vibrate or oscillate. The tensioned cable 5 has a first end 51 attached to the elongated body 1 at or near an upper end and a second end 59 attached to the base 2. The elongated body 1 is arranged to induce vibration of the tensioned cable 5. An energy harvester 6 is arranged inside the elongated body 1 for converting kinetic energy i.e., vibration of the tensioned cable 5, to electrical energy.

Referring again to FIG. 1, the elongated body 1 is generally cylindrical, i.e., has a cylindrical structure 12. The cylindrical structure 12 has a longitudinal axis X1. An elongated cavity 122 is arranged coaxially with the axis X1. The elongate body further comprises an end cap 11 fixedly attached to a top end portion 121 of the cylindrical structure 12, thereby closing the upper end of the cylindrical structure 12 and sealing the cavity 122.

The base 2 comprises a cylindrical housing 21 and a foundation 29 through which the base is connectable to the ground. In the example, the foundation 29 comprises a circular plate 291 with holes (not shown) for fixing the foundation 29 of the base 2 to the ground 9. The circular plate 291 is fixed horizontally to the ground 9. The cylindrical housing 21 is attached to the foundation 29 by joining and fixing the housing 21 concentrically onto the plate 291. A diameter of the cylindrical housing 21 is arranged to enclose a lower portion of the cylindrical structure 12 of the elongate body 1 thereby securing the elongated body 1 to the base 2. The cylindrical structure 12 and the cylindrical housing 21 form a continuous hole along the axis X1. In this example, the cylindrical housing 21 comprises a damping means 211 for preventing fatigue of the cylindrical structure 12. In the example the damping means 211 comprises a cylindrical metal bellows 212. As shown in FIG. 1, the metal bellows 212 is attached to a lower part 219 of the cylindrical housing 21 by a flange connection 215. In other examples, there is no such damping means 211 used or required.

FIG. 2 shows the first end 51 of the tensioned cable 5 arranged inside the cavity 122 of the elongated body 1. The end cap 11 comprises a cable tensioner 13, comprising a piston head 131 which is movable inside the end cap 11 along the longitudinal axis X1. Fluid channels 132 are arranged in the end cap 11 for biasing the piston head 131 upwards. A nut 111 and bolt 112 is connected to an upper end of the piston head 131 to secure the first end 51 to the end cap 11, thereby allowing adjusted tensioning of the cable 5 by use of the piston head 131.

FIG. 2 further shows the second end 59 of the tensioned cable 5 attached to the base 2, thereby providing a stationary fixing point for the second end 59 of the tensioned cable 5. Thus, the cable 5 is tensioned between the fixing points at the upper and lower ends.

In some embodiments, the cable tensioner 13 is positioned in the base 2 of the apparatus. In this case, the first end 51 is fixedly secured to the end cap and the second end 59 is secured to the piston head 131 in the base 2. Having the cable tensioner 13 in the base can make adjusted tensioning of the tensioned cable 5 easier.

In use, wind passing the cylindrical structure 12 results in a change in pressure around the cylindrical structure 12 and sets the elongated body 1 in motion so that it oscillates with the upper end moving back and forth. The oscillation affects the first end 51 thereby imposing wavelike motions upon the tensioned cable 5. Hence, the tensioned cable 5 moves or vibrates relative to both the ground 9 and to the elongated body 1. This relative movement can be utilised to produce electric energy by use of one or more energy harvesters 6 arranged inside the elongated body 1.

Figure 3:
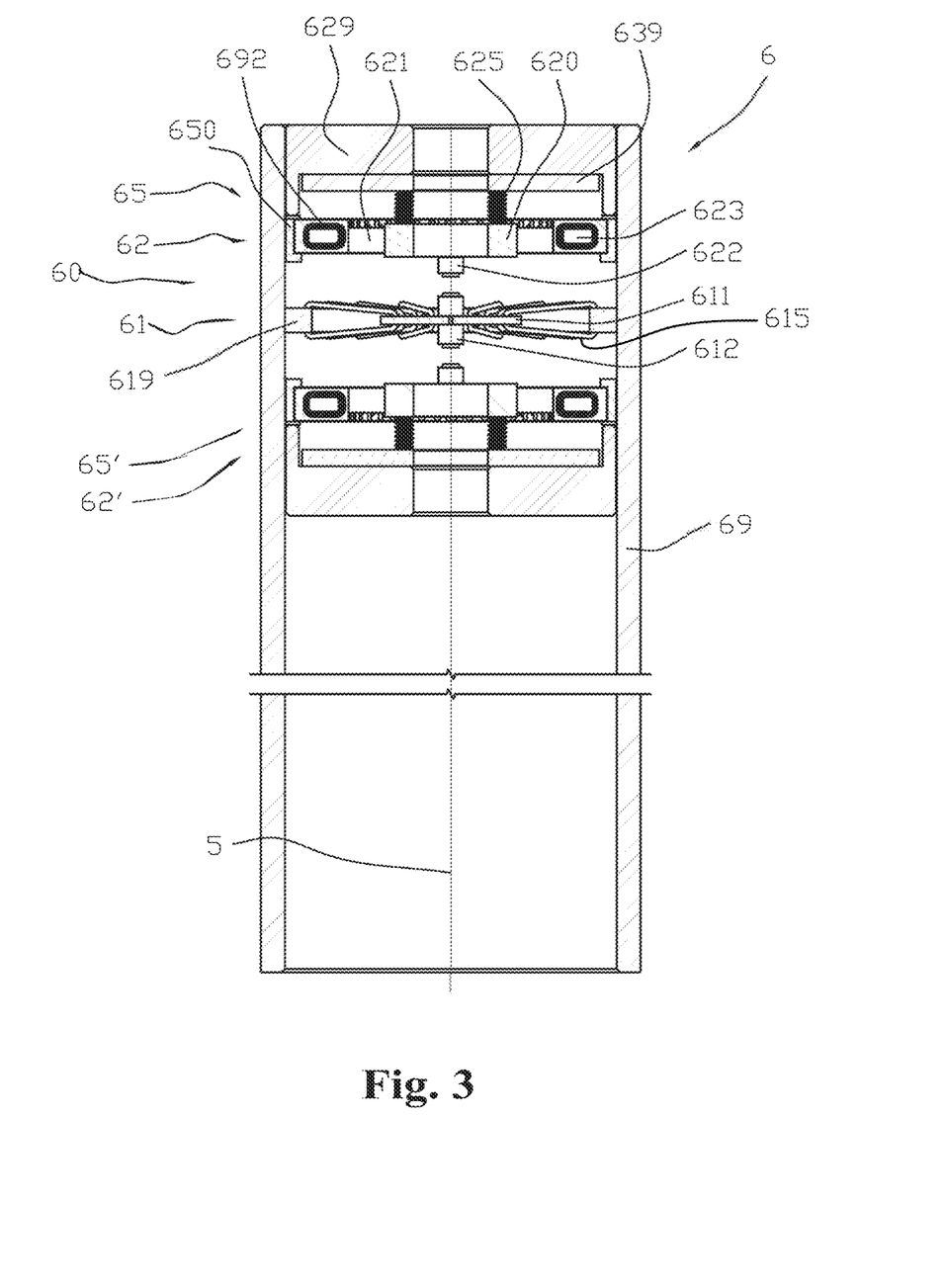
FIG. 3 shows a detailed vertical intersection of an energy harvester.
Figure 4:
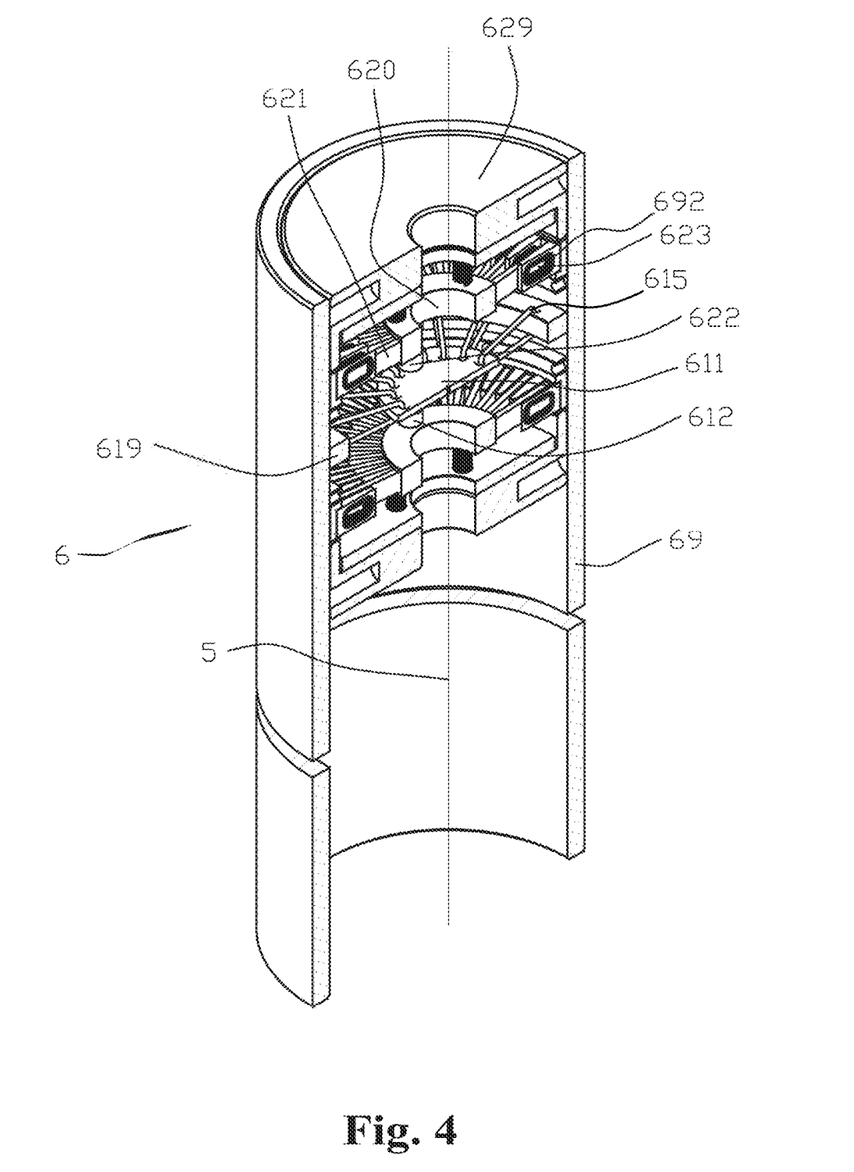
FIG. 4 shows the vertical intersection in FIG. 3 slightly rotated.

FIGS. 3 and 4 show the energy harvester 6 in further detail. The energy harvester 6 is arranged to convert movement of the tensioned cable 5 to electrical energy. The energy harvester 6 comprises a cylindrical support body 69 rigidly attached to the base 2 as shown in FIG. 2. In the example, the support body 69 extends approximately halfway along the elongated body 1. In other examples the support body 69 may have alternative positions along the elongated body 1.

The energy harvester 6 further comprises a vibration capture means 60, and a conversion means 65 for converting kinetic energy to electric energy. The vibration capture means 60 comprises a first capture means 61 and a second capture means 62 arranged inside the support body 69. The first capture means 61 is arranged to capture the energy of the horizontal vibrations by moving horizontally with the tensioned cable 5. The horizontal movement of the first capture means 61 is converted to vertical movement of the second capture means 62 by using oppositely oriented magnets.

The first capture means 61 is mounted on the tensioned cable 5 so as be movable laterally as the tensioned cable 5 moves laterally. The first capture means 61 comprises a disc 611 and three first magnets 612 fixed to the disc 611. The tensioned cable 5 extends through a centre of the disc 611 which is fixed to the tensioned cable 5 so that the disc 611 moves with the tensioned cable 5. The first magnets 612 are spaced apart on the disc 611 and arranged so that one pole is directed upwards and the opposite pole downwards. The first capture means 61 further comprises a first ring 619 enclosing an internal circumference of the support body 69. The first ring 619 is fixed to the support body 69. The disc 611 is coupled to the first ring 619 via elastic bands 615.

A second capture means 62 is supported on the inside of the support body 69 above the first capture means 61. The second capture means 62 further extends around the tensioned cable 5 and has a hole through a centre arranged for permitting free movement of the tensioned cable 5 laterally as it vibrates. The second capture means 62 further comprises three second magnets 622 oriented in opposite directions to the first magnets 612. So, as will be explained further, when the tensioned cable 5 moves, the position of the first magnets 612 are moved away from the second magnets 622, so that a repulsion force between the opposing sets of first magnets 612 and second magnets 622 fluctuates and transfers the lateral movement of the tensioned cable 5 to vertical movement of the second capture means.

The second capture means 62 comprises a central ring-shaped structure 620 with arms 621 attached. The arms 621 have one or more magnets 623 attached on an outer portion of the arms 621. The second capture means 62 further comprises a circular support structure 629 fixedly attached to the support body 69. The support structure 629 has a hole through the centre to allow free movement of the cable 5. The ring-shaped structure 620 is attached to a lower part 639 of the support structure 629 via four springs 625. The springs 625 are arranged around the longitudinal axis X1 and compress or extend in the direction along the axis X1 to allow for vertical movement of the second capture means 62.

The first capture means 61 is said to be centred when the centre of the disc 611 is aligned with the longitudinal axis X1. The magnets 612 and 622 are arranged so that when the first capture means 61 is centred, each of the of the first magnets 612 has a second magnet 622 directly above it, i.e., that the centre axis' of the magnets are aligned. The second magnets 622 is oriented in the opposite direction of the first magnets 612 so that the first magnets 612 and the second magnets 622 repel each other. The repulsion is strong when the magnets are close and weakens when the first magnets 612 move away.

When the tensioned cable 5 oscillates or vibrates, the first magnets 612 move in a horizontal direction as they are a part of the first capture means 61. The second magnets 622 observe a varying magnetic field causing the second capture means 62 to move vertically. Since the directions of the first magnets 612 and the second magnets 622 are opposite, the second capture means 62 is pushed upwards when the first capture means 61 approaches the centre of the support body 69. Gravity and/or the springs 625, pulls and/or pushes the second capture means 62 downwards when the first capture means 61 moves away from the centre of the support body 69. This way, movement of the tensioned cable 5 and the first capture means 61 in any horizontal direction is converted to vertical movement of the second capture means 62.

Conversion of the vertical movement of the second capture means 62 to electric energy is obtained by the magnets 623 of the second capture means 62 moving relative to the conversion means 65. The conversion means 65 is arranged inside the support body 69 at the same height as the magnets 623. The conversion means 65 comprises a second ring 650 enclosing a circumference of the support body 69. The conversion means 65 further comprises a plurality of coils 692 arranged circumferentially on an inside of the second ring 650. The coils 692 are directed so that a centre axis of each of the coils is parallel to the tangent of the circumference of the second ring 650 as shown in FIGS. 3 and 4. Furthermore, the coils 692 are arranged so that each of the magnets 623 extends into a spacing between two neighbouring coils 692.

As shown in the figures, the energy harvester 6 in this example has another set of second capture means 62' and conversion means 65' arranged inside the support body 69 below the first capture means 61. It operates the same way except the another set is turned 180 degrees upside down compared to the second capture means 62 and the conversion means 65. Having two sets of second capture means 62 and conversion means 65 can be advantageous in that the first magnets 612 observe opposing magnetic forces, so that vertical motion of the first capture means 61 can be prevented.

When the second capture means 62 oscillate vertically relative to the coils 692, a varying magnetic field induces an electric current in the coils 692. The coils 692 are connected to a battery (not shown) or an electricity net (not shown) so that the electricity can be utilized. An arrangement for making hydrogen gas from the produced electricity by electrolysis may also be employed.

Figure 7A:
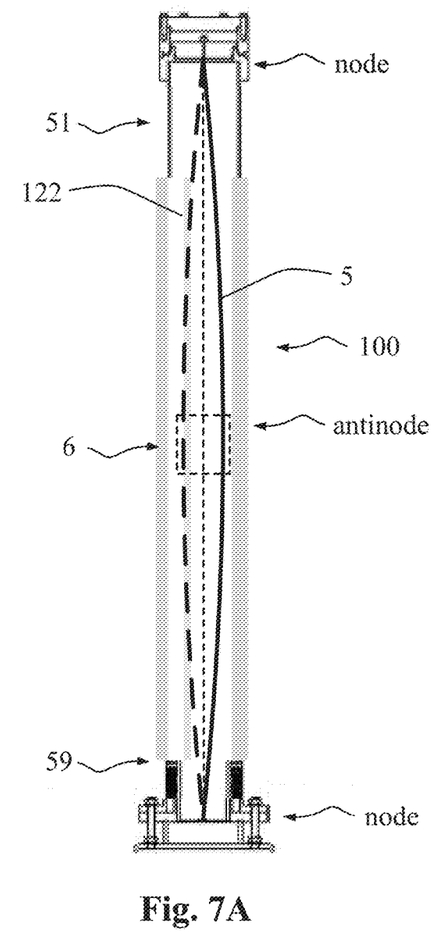
FIG. 7A shows a diagram of the apparatus with an example standing wave pattern.
Figure 7B:
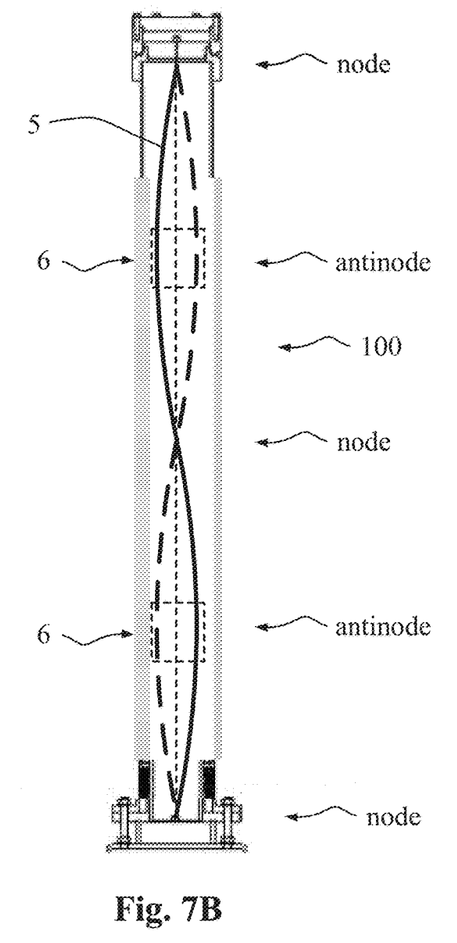
FIG. 7B shows a diagram of the apparatus with another example standing wave pattern.

Several energy harvesters 6 can be employed inside the elongated body 1. Preferably, the positioning of the energy harvesters 6 are based on the pattern at which the waves travel on the tensioned cable 5. Furthermore, the tension of the tensioned cable 5 can be changed to adjust the oscillation pattern. In some examples the tension of the cable 5 may be adjusted to create standing waves where the energy harvesters 6 are positioned close to antinodes for the standing waves, i.e., in the middle of two nodes. If the average wind speed results in one antinode, one energy harvester 6 positioned in the centre of the cavity 122 is typically employed (see, e.g., FIG. 7A). In the case of two antinodes, two energy harvesters 6 are employed, one ⅓ into the cavity 122 and the other ⅔ into the cavity (see, e.g., FIG. 7B), etc. FIGS. 7A and 7B show diagrams of the apparatus with example standing wave patterns of tensioned cable 5 (with a large magnitude wave shown for clarity) and example locations of energy harvesters 6.

Arranging the energy harvesters 6 as described above with reference to the drawings allows vibration of the cable 5 in any horizontal direction to be converted into movement in one direction, namely vertical. This enables production of electrical energy regardless of the direction of the wind or the direction of the oscillations of the elongated body 1.

Figure 5:
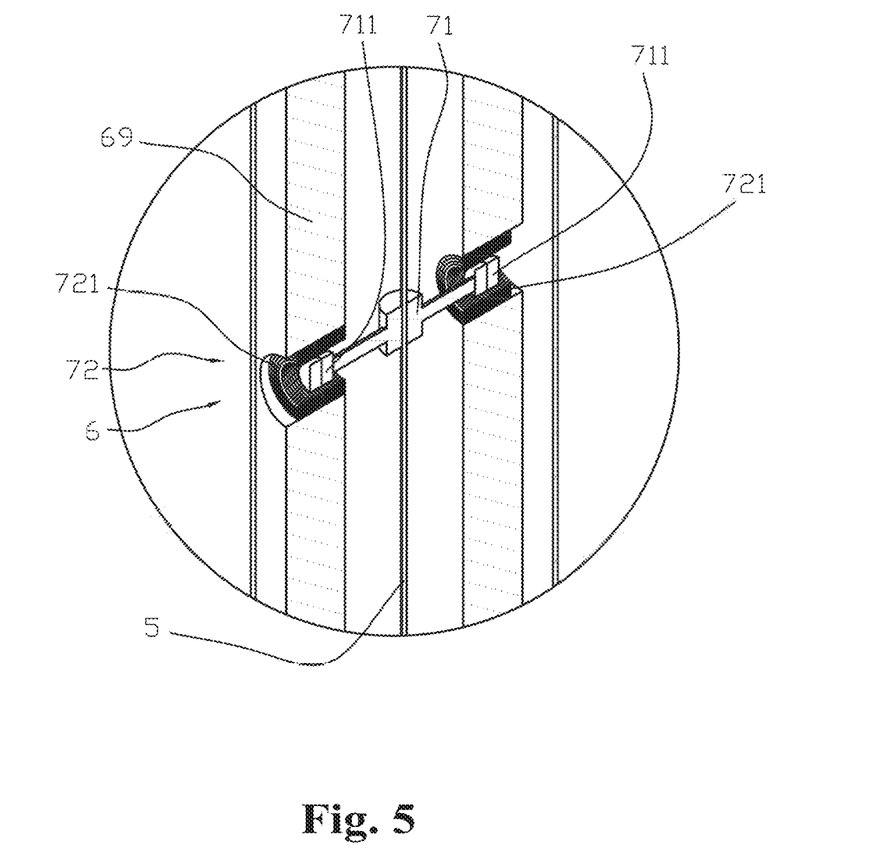
FIG. 5 shows a vertical intersection of an alternative embodiment of an energy harvester.
Figure 6:
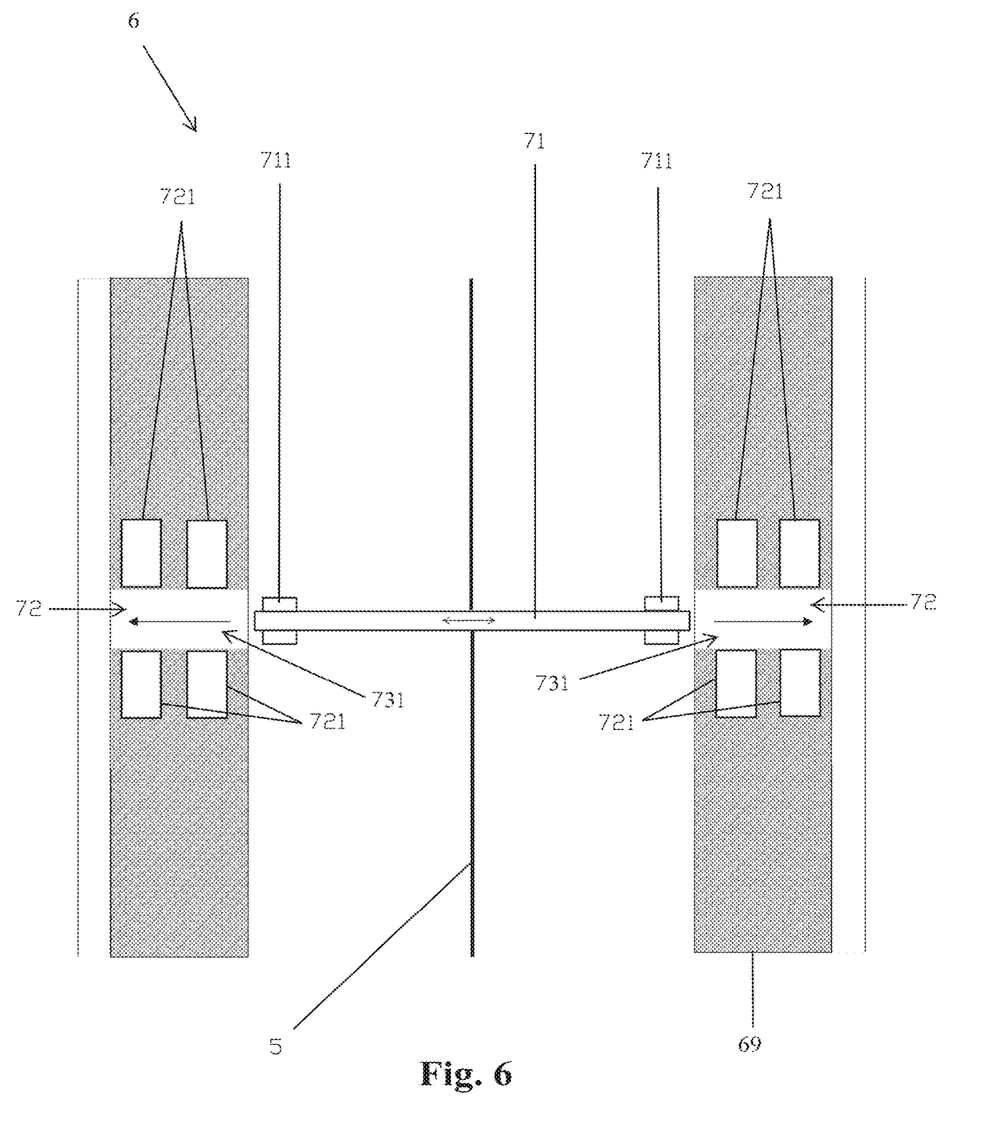
FIG. 6 shows a schematic diagram of an alternative embodiment of an energy harvester.

In another example, the energy harvesters 6 are arranged to convert horizontal movement directly to electrical energy, see FIGS. 5 and 6.

An arrangement for this is shown in FIG. 5 where an energy harvester 6 comprises a horizontal magnet body 71 and a coil arrangement 72. A centre of the horizontal magnet body 71 is attached to the tensioned cable 5. The magnet body 71 is elongated in a horizontal direction with two magnets 711 attached thereto, one in each extremity of the magnet body 71. The coil arrangement 72 comprises two coils 721 attached to the support body 69. The coil arrangement 72 is arranged to receive each of the magnets 711 and to produce electricity when the magnet body 71 moves with the tensioned cable 5. The energy harvester 6 in this example requires the tensioned cable 5 to move in one direction, defined by the direction of the coils 721. To adjust for different wind directions, an arrangement for rotating the support body 69 can be employed. The coils 721 in this example are horizontal coils.

Another arrangement for this is shown in FIG. 6, where an energy harvester 6 comprises a horizontal magnet body 71 and a coil arrangement 72. A centre of the horizontal magnet body 71 is attached to the tensioned cable 5. The magnet body 71 is elongated in a horizontal direction with two magnets 711 attached thereto, one in each extremity of the magnet body 71. The coil arrangement 72 comprises coils 721 attached to the support body 69. The coils 721 in this example are vertical coils with windings about the vertical axis, and the magnets 711 pass into a region 731 between the coils 721 to produce electricity when the magnet body 71 moves with the tensioned cable 5. The horizontal movement of the magnet body 71 enables the magnets 711 to interact with the coil arrangement 72. In contrast to FIG. 5, the energy harvester 6 in this example of FIG. 6 does not require the tensioned cable 5 to move in one direction, since the magnet when in the region between the coils is not restricted by the coils 721.

The apparatus 100 may also be used to produce electrical energy from water currents and water waves. When placed in water, the forces acting on the elongated body 1 can be stronger than when exposed to wind. Hence the dimension of the cylindrical structure 12 can be made smaller and the elongated body 1 may be secured in both ends. In this case two tensioned cables 5 can be arranged inside the elongated body 1, so that first ends 51 of the tensioned cables 5 are secured to a middle portion of the elongated body 1, the cables 5 extending in opposite directions along the elongated body. The elongated body 1 may also extend horizontally, vertically or in any direction suited to take up the energy from the water. In some embodiments, multiple tensioned cables 5 can be arranged transversal to the longitudinal axis X1 of the elongated body. In this case, the tensioned cables 5 are secured in both ends to an inside of the cylindrical structure 12. When the cylindrical structure 12 is set in motion by the passing water, both ends of the tensioned cable 5 are set in motion. Multiple energy harvesters 6, one for each tensioned cable 5, are in this example arranged on a rigid bar extending along the longitudinal axis X1 inside the cylindrical structure 12.

In some variants, the single tensioned cable 5 does not need to pass through the energy capture means and may be replaced by a first cable which extends from the first fixing point at the end cap to the first energy capture means and a second cable which extends from the first energy capture means to the second fixing point at the base. Clearly also, the energy conversion can be configured in a variety of other ways using the vibrations of the cable(s) with an energy conversion device on the cable(s), once the oscillations of the elongated cylindrical body set the cable(s) with the energy conversion device on the cable(s) into vibration.

The invention claimed is:

1. An apparatus for producing electricity from a moving fluid comprising:
    an elongated body having a longitudinal axis, the elongated body being arranged to be attached to a ground or seabed and exposed to the moving fluid;
    at least one tensioned cable, which is supported in tension from the elongated body, and which is arranged at least in part inside the elongated body and further arranged to oscillate or vibrate upon oscillation of the elongated body imposing wavelike motions upon the at least one tensioned cable hence the at least one tensioned cable moves or vibrates relative to both the ground or the seabed and to the elongated body,
        wherein the at least one tensioned cable is arranged to establish a standing wave pattern having a plurality of nodes and at least one antinode; and
    at least one energy harvester for utilizing movement of the at least one tensioned cable relative to the ground or the seabed and the elongated body to produce electric energy wherein the at least one energy harvester is positioned inside the elongate body and more proximate to the antinode than to the ground or seabed.

2. The apparatus according to claim 1, wherein the at least one tensioned cable is arranged at least in part along the longitudinal axis.

3. The apparatus according to claim 1, wherein the at least one energy harvester comprises at least one magnet and at least one coil.

4. The apparatus according to claim 1, wherein the elongated body comprises a cylindrical structure arranged to be exposed to the moving fluid in use.

5. The apparatus according to claim 1, wherein an end of the elongated body is attached fixedly to the ground or the seabed in use, the elongated body further extending vertically from the ground or the seabed and being exposed to wind.

6. The apparatus according to claim 1, wherein the at least one tensioned cable has an end which is fixedly secured to the elongated body.

7. The apparatus according to claim 6, wherein the at least one tensioned cable has another end which is fixedly secured to or near the ground or the seabed.

8. The apparatus according to claim 1, further comprising a support body for supporting at least a part of the energy harvester within the elongate body such that the energy harvester is adjacent to a portion of the at least one tensioned cable, the support body being arranged inside the elongated body and extending along the longitudinal axis.

9. The apparatus according to claim 1, wherein the at least one energy harvester further comprises a vibration capture means for capturing at least part of the kinetic energy of the at least one tensioned cable.

10. The apparatus according to claim 9, wherein the vibration capture means comprises at least one magnet, and the at least one energy harvester further comprises a conversion means comprising at least one coil, the vibration capture means being arranged to be set in motion by the at least one tensioned cable and to move relative to the at least one coil.

11. The apparatus according to claim 10, wherein the at least one coil is a vertical coil or a horizontal coil.

12. The apparatus according to claim 9, the vibration capture means further comprising a first capture means and a second capture means, the first and second capture means being arranged to transfer horizontal movement to vertical movement, wherein the first capture means is fixed to the at least one tensioned cable and the second capture means is attached to a support body and arranged to move vertically in use.

13. The apparatus according to claim 12, wherein the support body is fixed to the ground or the seabed and arranged to be static relative to the elongated body.

14. The apparatus according to claim 12,
wherein the first capture means comprises:
a disc having a surface through which the at least one tensioned cable extends; and
a first magnet fixed to the disc and positioned with a first pole of the first magnet directed in a first direction along the longitudinal axis; and
wherein the second capture means comprises:
a structure having a first side and a second side,
a spring fixed to the first side, wherein the structure is coupled to the support body via the spring; and
a second magnet fixed to the second side and positioned with the first pole of the second magnet is directed in a second direction along the longitudinal axis that is opposite to the first direction, such that the first magnet repels the second magnet thereby causing the second capture means to move vertically in response to horizontal movement of the first capture means.

15. A method of producing electric energy from wind by use of the apparatus claimed in claim 1.

16. An apparatus for producing electricity from a moving fluid comprising:
an elongated body having a longitudinal axis, the elongated body being arranged to be attached to a ground or seabed and exposed to the moving fluid;
at least one tensioned cable, which is supported in tension from the elongated body, and which is arranged at least in part inside the elongated body and further arranged to oscillate or vibrate upon oscillation of the elongated body imposing wavelike motions upon the at least one tensioned cable hence the at least one tensioned cable moves or vibrates relative to both the ground or the seabed and to the elongated body; and
at least one energy harvester for utilizing movement of the at least one tensioned cable relative to the ground or the seabed and the elongated body to produce electric energy,
wherein the at least one energy harvester further comprises a vibration capture means for capturing at least part of the kinetic energy of the at least one tensioned cable, the vibration capture means further comprising a first capture means and a second capture means, the first and second capture means being arranged to transfer horizontal movement to vertical movement, wherein the first capture means is fixed to the at least one tensioned cable and the second capture means is attached to a support body and arranged to move vertically in use,
wherein the first capture means comprises:
a disc having a surface through which the at least one tensioned cable extends; and
a first magnet fixed to the disc and positioned with a first pole of the first magnet directed in a first direction along the longitudinal axis; and
wherein the second capture means comprises:
a structure having a first side and a second side,
a spring fixed to the first side, wherein the structure is coupled to the support body via the spring; and
a second magnet fixed to the second side and positioned with the first pole of the second magnet is directed in a second direction along the longitudinal axis that is opposite to the first direction, such that the first magnet repels the second magnet thereby causing the second capture means to move vertically in response to horizontal movement of the first capture means.

* * * * *